US008023730B2

(12) United States Patent
Holm et al.

(10) Patent No.: US 8,023,730 B2
(45) Date of Patent: Sep. 20, 2011

(54) METHOD THAT IMPROVES HUMAN INTERPRETATION OF COLOR IMAGES WITH LIMITED SPECTRAL CONTENT

(75) Inventors: Anders Holm, Sodra Sandby (SE); Olle Holm, Lund (SE)

(73) Assignee: Lyyn AB, Lund (SE)

( * ) Notice: Subject to any disclaimer, the term of this patent is extended or adjusted under 35 U.S.C. 154(b) by 1020 days.

(21) Appl. No.: 11/629,343

(22) PCT Filed: Jun. 8, 2005

(86) PCT No.: PCT/EP2005/052645
§ 371 (c)(1),
(2), (4) Date: Dec. 11, 2006

(87) PCT Pub. No.: WO2005/122085
PCT Pub. Date: Dec. 22, 2005

(65) Prior Publication Data
US 2008/0304695 A1   Dec. 11, 2008

Related U.S. Application Data

(60) Provisional application No. 60/521,650, filed on Jun. 11, 2004.

(30) Foreign Application Priority Data

Sep. 13, 2004   (EP) ..................................... 04021699

(51) Int. Cl.
*G06K 9/00*   (2006.01)
(52) U.S. Cl. ........................................................ 382/168
(58) Field of Classification Search .......... 382/166–168, 382/162; 358/518, 522
See application file for complete search history.

(56) References Cited

FOREIGN PATENT DOCUMENTS

| JP | 01-161507 A | 6/1989 |
| JP | 04-230766 A | 8/1992 |
| JP | 09-149257 A | 6/1997 |
| JP | 09-284642 A | 10/1997 |
| JP | 10-275235 A | 10/1998 |
| JP | 2000-215306 A | 8/2000 |
| JP | 2001-257905 A | 9/2001 |
| JP | 2002-158893 A | 5/2002 |
| JP | 2003-284705 A | 10/2003 |

OTHER PUBLICATIONS

S. Chitwong, et al; "Enhancement of Color Image Obtained from PCA-FCM Technique Using Local Area Histogram Equalization;" Proceedings of the SPIE—The International Society for Optical Engineering SPIE—Int. Soc. Opt. Eng USA, vol. 4787, 2002, pp. 98-106.

(Continued)

*Primary Examiner* — Duy M Dang
(74) *Attorney, Agent, or Firm* — Ladas & Parry LLP

(57) ABSTRACT

The present invention relates to image processing in general and more specifically to methods and means facilitating the human detection of physical object representations in colour images with a wide range of applications such as aviation and air transport, land transportation, shipping, submarine work, underwater inspections, medical investigations, marine archaeology, land archaeology, agriculture, surveillance and security, food safety, energy systems and forestry. The invention achieves this by providing an image processing method for a colour image representation, Ic, formed by at least two distinct colour pixel matrixes, Mi, by carrying out a histogram equalization processing step (250), which is carried out separately for each colour pixel matrix. Different pre-washing steps may be applied prior to the histogram equalization processing step (250). The invention also provides a number of apparatuses adapted for different applications using the method according to the invention.

24 Claims, 10 Drawing Sheets

OTHER PUBLICATIONS

Daw-Tung Lin, et al; "Image Back-Light Compensation With Fuzzy C-Means Learning Algorithm and Fuzzy Inferencing;" Signal Processing and its Applications, 2003, Proceedings, Seventh International Symposium on Jul. 1-4, 2003, Piscataway, NJ USA, IEEE.

Stefan Fischer, et al; "Analysis of Skin Lesions With Pigmented Networks;" Proceedings, International Conference on Image Processing (Cat. No. 96CH35919) IEEE New York, NY, USA, vol. 1, 1996.

I. Pitas, et al; "Multichannel Histogram Equalization With Applications in the HSI Color Space;" Signal Processing Theories and Applications, Brussels, Aug. 24-27, 1992, Proceedings of the European Signal Processing Conference (EUSIPCO), kAmsterdam, Elsevier, NL, vol. 3, Conf. 6 24, Aug. 1992.

A.R. Weeks, et al; "Histogram Specification of 24-bit color images in the color difference (C-Y) color space;" Proceedings of the SPIE—The International Society for Optical Engineering SPIE—INT, soc. Opt, Eng USA, vol. 3646, 1999, pp. 319-329.

METHOD THAT IMPROVES HUMAN INTERPRETATION OF COLOR IMAGES WITH LIMITED SPECTRAL CONTENT

CROSS REFERENCES

This application is related with the US-provisional application 60/521,650 filed on Jun. 6, 2004, and entitled "A method that improves human interpretation of colour images with limited spectral content", by Anders Holm & Olle Holm, both Swedish citizens. The US-provisional application 60/521,650 is hereby incorporated by reference and is not admitted to be prior art with respect to the present invention by its mention in this application.

TECHNICAL FIELD

The present invention relates to image processing in general and more specifically to methods and means for the effective detection of physical object representations in colour images with a wide range of applications such as aviation and air transport, land transportation, shipping, submarine work underwater inspections, medical investigations, marine archaeology, land archaeology, agriculture, surveillance and security, food safety, energy systems and forestry.

BACKGROUND

Assume an object, O, imaged on the human retina and subsequently "seen" in the visual cortex of the brain. The quality of the image I, can be described in terms of how useful I is for "understanding" O and/or as the perceived similarity between O and I. Thus if one, or a combination, of the following items a) the space (empty space, air, fluid) between the eye and the object is "contaminated" with fog, haze, smoke, snow, dust, silt or other types of dispersed particles (e.g. blood corpuscles)

b) the space (gas, fluid) between the eye and the object has a different wavelength dependent relative transparency compared to normal air or vacuum c) the object O has limited colour content d) the image is captured in conditions where retinal receptors have particularly limited capacity to separate luminance or colour differences, e.g. low-light conditions occur, then the quality of the perceived image I can be severely disturbed which in turn means that the interpretation of I can be deficient. Such a disturbance in visual appearance can have grave practical consequences in situations like investigations of the body's interior (e.g. the eye), air traffic control, driving, other land or sea traffic, underwater work, fire fighting or other surveillance situations. Pathological details in the fundus of the eye can be missed because of blood contamination, an airplane or a ship can be missed in the fog, a fire fighter can lose his way in the smoke, a diver may not find his way out of a wreck. Thus, in such situations, the lack of effective image enhancing systems providing a possibility to facilitate the human interpretation of images, i.e. enhancing the human seeing, constitute a serious problem. Below some areas of interest and problems are discussed in more detail.

Aviation and Air Transport

Fog, smog, haze, snow, smoke, rain, clouds of living beings such as bugs and insects, e.g. grasshoppers, bees etc, low-light conditions, e.g. at dusk and dawn or inadequate lighting, i.e. inadequate for unaided detail perception, at airports and/or outside/inside cockpit, constitute a security risk for air travel in general and cause severe air traffic control problems with possible rerouting or cancellation of flights as a result Obviously, these problems may also cause negative economical consequences for both airline companies and passengers, and in the worst case even mortal accidents. Even though the air traffic is guided and controlled by sophisticated navigation and radar systems, there is still the need to have visual contact. Too many accidents have been caused by reduced visibility and unknown objects moving. Even a slight increase in visibility would give the pilot and air traffic controller a better chance to handle difficult situations. Thus, there is a need to provide means and methods that overcome or reduce these problems.

Land Transportation

In a similar way smog, haze, snow, smoke, rain, clouds of living beings such as bugs and insects, e.g. grasshoppers, bees etc, low-light conditions, e.g. at dusk and dawn or inadequate lighting, i.e. inadequate for unaided detail perception, constitute problems regarding road and railway safety and may also increase costs of goods transportation. Thus, there is a need to provide means and methods that overcome or reduce these problems.

Shipping

Even though ships usually have very sophisticated navigation equipment, e.g. radar, GPS and so forth, the crew still need to have visual contact with for instance shore line, small boats and other ships. It may be a problem to establish such a visual contact in environments containing smog, haze, snow, smoke, rain, clouds of living beings such as bugs and insects, e.g. grasshoppers, bees etc, low-light conditions, e.g. at dusk and dawn or inadequate lighting for unaided detail perception. As a consequence, either safety or shipping cost is compromised. Thus, there is a need to provide means and methods that overcome or reduce these problems.

Submarine Applications

Silt, particles, 'floating' sediments, wavelength filtering by water, inadequate lighting, i.e. inadequate for unaided detail perception under water, clouds of living beings such as e.g. algae, plankton etc all make human interpretation of images more difficult under water. A general problem is that all underwater work close to the bottom of the sea is difficult because of sea floor silt and how easily it is disturbed. This bottom disturbance creates a dense "fog" which highly reduces visibility. This is both a security problem and an economical problem during diving, or e.g. during installation work under water when using e.g. a submerged vehicle with video recording equipment. For instance, the diver may lose orientation with possible catastrophical consequences and some building and/or installation work become unnecessarily expensive or even impossible to carry out due to these problems. As an example, under-sea infrastructure such as bridges, dams, oil and gas pipelines, drilling platform parts, telecommunication cables, etc, must be constructed/installed, inspected and maintained, and all these activities require an accurate interpretation of underwater images in order to be carried out effectively. Also, ships and boats, commercial or for leisure purposes, must be maintained and inspected below the sea surface. If the boat is small this is done by lifting it out of the sea. If the ship is large it is done either by a diver or a video equipped ROV (Remotely Operated Vehicle) The processed video footage gives a much better picture of potential problems. A problem is that when the sea floor is accidentally disturbed, the silt will prevent any more work until it has set. This is both dangerous and leads to efficiency problems. Any underwater construction or inspection is difficult because of visibility problems, depending on the water quality, silt, and amount of particles and other of above visibility disturbances.

Thus, there is a need to find methods and means facilitating the human interpretation of images in such situations so as to, possibly in combination with video equipped "Remotely Operated Vehicles" (ROV), reduce the time and cost required for carrying out such activities and improving safety.

Medical Applications

Various particles, such as blood corpuscles, in medical recording or viewing situations (e.g. during opthalmology, eye fundus inspection, skin image inspection, identification of local cell variations in endoscopic images, etc.) make human interpretation of images more difficult which may lead to erroneous diagnoses and/or misjudgments regarding accurate medical treatment. Apart from causing human suffering, this causes economical problems in terms of costs for both society and patients, some of which may have to live with severe handicaps for the rest of their lives. Thus, there is a need to provide means and methods that overcome or reduce these problems.

Marine Archaeology

Marine archaeology means disturbing the bottom of the sea with great visibility problems. Often the only possibility to retrieve artefacts is through "vacuuming" and filtering, but that destroys a lot of information, for instance the position of the artefact. Thus, there is a need to provide means and methods that overcome or reduce these problems.

Land Archaeology

Finding the place for digs is much more efficient if it would be possible to utilize airplane mounted video equipment. However, a problem is that no effective image processing technology capable to find remains through difference in soil colour, for instance pole holes from houses and other constructions, is available today. Thus, there is a need to provide means and methods that overcome or reduce this problem.

Also, much of the age estimation in a dig is done through the knowledge of different soil layers dating from different time periods. There is thus a need to provide effective methods and means capable of facilitating the detection and interpretation of different soils providing a possibility to estimate the "historical age" of soils in an accurate and secure manner.

Agriculture

Polluted soil areas differ slightly in colour from the surroundings. The colour difference can be so small that it is difficult to detect it with pure visual inspection. Thus, there is a need to provide effective methods and means capable of facilitating the detection of polluted soil.

Crop quality and growth status can be seen in slight colour differences. The colour difference can be so small that it is difficult to detect it with pure visual inspection. There is a need to provide effective methods and means capable of detecting crop quality and growth status based on said colour differences in an accurate, secure and efficient way.

Food Safety

The quality degradation of food and eatables often manifests itself as small colour changes, for instance meat turns darker when it turns bad. There is a need to provide effective methods and means capable of detecting the quality degradation of food based on said colour changes in an accurate, secure and efficient way.

Energy Systems

In many cases airborne inspections are carried out for the purpose of power grid network planning, maintenance and control, e.g. in case of power failures, after storms, etc. Thus, there is a need to provide effective methods and means capable of facilitating the accurate interpretation of images captured during such airborne inspections, facilitating an effective planning, operation, maintenance and control of the power grid network.

Forestry

In many cases airborne inspections are used in forest maintenance and control, e.g. to investigate/estimate quality, growth, health status, environmental problems, illegal logging, etc. There is a need to provide effective methods and means capable of facilitating the accurate interpretation of images captured during such airborne inspections, allowing an effective inspection, maintenance and control of forests.

Monitoring/Security/Surveillance

Imagine a surveillance pan camera mounted immediately under the roof of an airport terminal building. The camera may be tilted and is mainly pointed at the tarmac. The camera is used for security surveillance as well as general activity surveillance. Imagine further that the weather conditions are foggy. In such situations it is certainly a problem that the detection of unauthorized personnel, which may be recognised e.g. by wearing clothes and/or objects having a specific form and/or reflection characteristics, is hindered by the low visibility. Thus, there is a need to provide effective methods and means capable of accurately distinguishing authorised personnel from unauthorised persons in colour images captured during difficult image conditions.

The information given in this background section is intended to better understand the invention and no information is admitted to be prior art with respect to the present invention by its mention in this background section.

Thus, there is a need to find methods and means that solves or alleviates the problems discussed above and which are capable of detecting various object representations in colour images in an effective and efficient way, e.g. for the applications discussed above.

SUMMARY

It is an object of the present invention to provide methods and means that solves or alleviates the problems discussed above and which are capable of detecting various object representations in colour images in an effective and efficient way, e.g. for the applications discussed above.

It is an object of the present invention to facilitate the human interpretation of colour images.

Another object of the present invention is to provide a user friendly, interactive, image processing means being versatile in use, so as to facilitate the human interpretation of colour images in a wide range of different applications and situations in an economical manner.

Still a further object of the present invention is to provide apparatuses specifically adapted for the various applications discussed above, which solve/alleviate above problems/drawbacks and/or fulfill above needs in an effective and efficient manner.

The invention essentially achieves this by providing an image processing method facilitating the human detection of physical object representations in a colour image, and a set of apparatuses and devices working in accordance with the method of the invention.

According to a first aspect, the present invention achieves above objects by providing a method for detecting physical object representations in a colour image, $I_C$, formed by at least two distinct colour pixel matrixes, $M_N$, wherein said image, $I_C$, is processed at least by histogram equalization processing step comprising the following steps:

selecting at least a first colour pixel matrix, $M_1$, from said at least two distinct colour pixel matrixes $M_N$, separately carrying out a histogram equalization processing step, for at least said first colour pixel matrix, $M_1$, forming an updated version, $M_1'$, of said first colour pixel matrix, forming an updated version, $I_C'$, of said image, $I_C$, so that $I_C'$ comprises at least said updated colour pixel matrix, $M_1'$, displaying said updated version, $I_C'$, on a display, whereby said updated colour image representation, $I_C'$, facilitates the human detection of said object representations by evidencing said object representations in said colour image representation, $I_C'$.

According to the invention, said histogram equalization step is normally carried out separately for each and all of said colour pixel matrixes, $M_N$, forming updated versions, $M_N'$, of said colour pixel matrixes, and forming an updated version, $I_C'$, of said image, $I_C$, so that $I_C'$ comprises all of said updated colour pixel matrixes, $M_N'$.

In one embodiment, the method according to the invention comprises a first type of pre-washing step, which is carried out before said histogram equalization step, wherein said first type of pre-washing step, comprises the following steps:

creating an intensity histogram, $I_{HI}$, for at least one specific colour pixel matrix, selecting at least one range of pixel intensity values for said intensity histogram, $I_{HI}$, creating an updated version $I_{HI}'$ of said intensity histogram by discarding the intensity histogram values within said range, feeding the following histogram equalization step, with $I_{HI}'$ as input for further processing.

In another embodiment, the method according to the invention comprises a second type of pre-washing step, which is carried out before said histogram equalization step, wherein said second type of pre-washing step comprises the following steps:

identifying at least one undesired pixel area in said image representation, $I_C$, and, discarding all pixel values within said area forming an updated version, $I_C'$, of said image representation, feeding the following histogram equalization step with $I'_{HI}$ as input for further processing. Said identification step can be carried out e.g. by an image segmentation algorithm, e.g. a text recognition algorithm. The identification step may comprise human interaction, e.g. by moving pointing means over a display displaying said image, $I_C$.

In one embodiment, said histogram equalization processing step comprises the following steps computing an intensity distribution histogram, IDH, for said first colour pixel matrix, $M_1$, calculating the normalized cumulative sum, NCS, for said IDH, choosing a threshold value, K, for said normalized cumulative sum, NCS, identifying pixel intensity values A and B defining a first range, $R_{AB}$, of pixel intensity values based on said threshold value K, in IDH, forming an updated version, IDH', of said intensity distribution histogram by discarding all pixel intensity values outside said range $R_{AB}$, mapping the pixel values within said first range $R_{AB}$ on to a second larger range, $R_{AB}'$, of pixel intensity values. Said threshold value, K, may be chosen by human interaction by positioning a control means.

In a further embodiment, the method according to the invention comprises the step of capturing said colour image representation, $I_C$, by using sensors having a spectral range at least between about 400 and 800 nm.

In still a further embodiment the processing method according to the invention is applied on a sequence of consecutive colour images, on an image by image basis.

In still a further embodiment, the method according to the invention comprises the following steps:

storing, before said histogram equalization step, at least one identical version of said colour image representation, $I_C$, by copying $I_C$ in said storage means, forming at least two stored versions $I_C$, $I_{C2}$, of said image $I_C$ in said storage means, carrying out, in parallel, said histogram equalisation step for said at least two identical colour images, $I_C$, $I_{C2}$, using different parameter settings regarding type of pre-wash and/or stretching factor, K, and/or matrix combination for $I_C$ in respect of the parameter settings for $I_{C2}$, and, forming at least two updated images $I_C'$, $I_{C2}'$, and displaying said updated images $I_C'$, $I_{C2}'$, on display means.

According to a second aspect, the invention provides a computer readable medium with stored computer program code means wherein said stored program code means comprises program code means to make a computer execute at least one procedure realizing the method according to the invention, when said program is loaded in said computer.

According to a third aspect, the invention provides an image processing apparatus having processing means with access to a digital representation of a colour image, $I_C$, captured in storage means by capturing means or through data communication means or through video connection means wherein said storage means has stored program code means to make said processing means execute at least one procedure realizing the method according to the invention, when said program code means is loaded in said processing means.

In one embodiment, the image processing apparatus comprises interactive control means interconnected with said processing means wherein said control means allows for an interactive control of said threshold value, K, and thereby the degree of intensity distribution expansion in said histogram equalization step.

Said display means may be arranged to interact with interactive pointing means.

In one embodiment, the image processing apparatus according to the invention comprises interactive pre-wash selecting means, and/or selecting means allowing an interactive selection of what specific combination of updated colour pixel matrixes $M_N'$ is used to form said updated image $I_C'$.

According to a fourth aspect, the invention provides a camera which comprises an apparatus according to the third aspect of the invention.

According to a fifth aspect, the invention provides a video camera which comprises an apparatus according to the third aspect of the invention.

According to a sixth aspect, the invention provides a detector device for detecting physical object representations in colour images, said detector comprising means for providing specific lighting conditions and an apparatus according to the third, fourth or fifth aspect of the invention.

According to a seventh aspect, the invention provides a security surveillance and/or monitor system comprising an apparatus according to the third, fourth, fifth or sixth aspect of the invention.

According to an eight's aspect, the invention provides a vehicle comprising an apparatus according to the third, fourth, fifth, sixth or seventh aspect of the invention.

According to a ninth aspect, the invention provides a vehicle according to the eight's aspect of the invention wherein said image processing apparatus comprises display means adapted for projecting said image, $I_C$, on at least one windscreen of the vehicle.

According to tenth aspect, the invention provides a Remotely Operated Vehicle comprising colour image capturing means communicating with an apparatus according to the third, fourth, fifth, sixth or seventh aspect of the invention.

According to an eleventh aspect, the invention provides an apparatus for inspecting the inner parts of the human eye comprising means for capturing a colour image from the inside of the eye wherein said capturing means are connected with an apparatus according to the third, fourth, fifth, sixth or seventh aspect of the invention.

According to a twelfth aspect, the invention provides a face mask comprising colour image display means arranged for eye view wherein said display means are connected with an apparatus according to the third, fourth, fifth, sixth or seventh aspect of the invention.

These and other features, aspects and advantages of the present invention will become apparent when reading the following description and claims together with the accompanying drawings.

DETAILED DESCRIPTION

The invention shall now be described in more detail with reference to the accompanying drawings.

Figure 1:
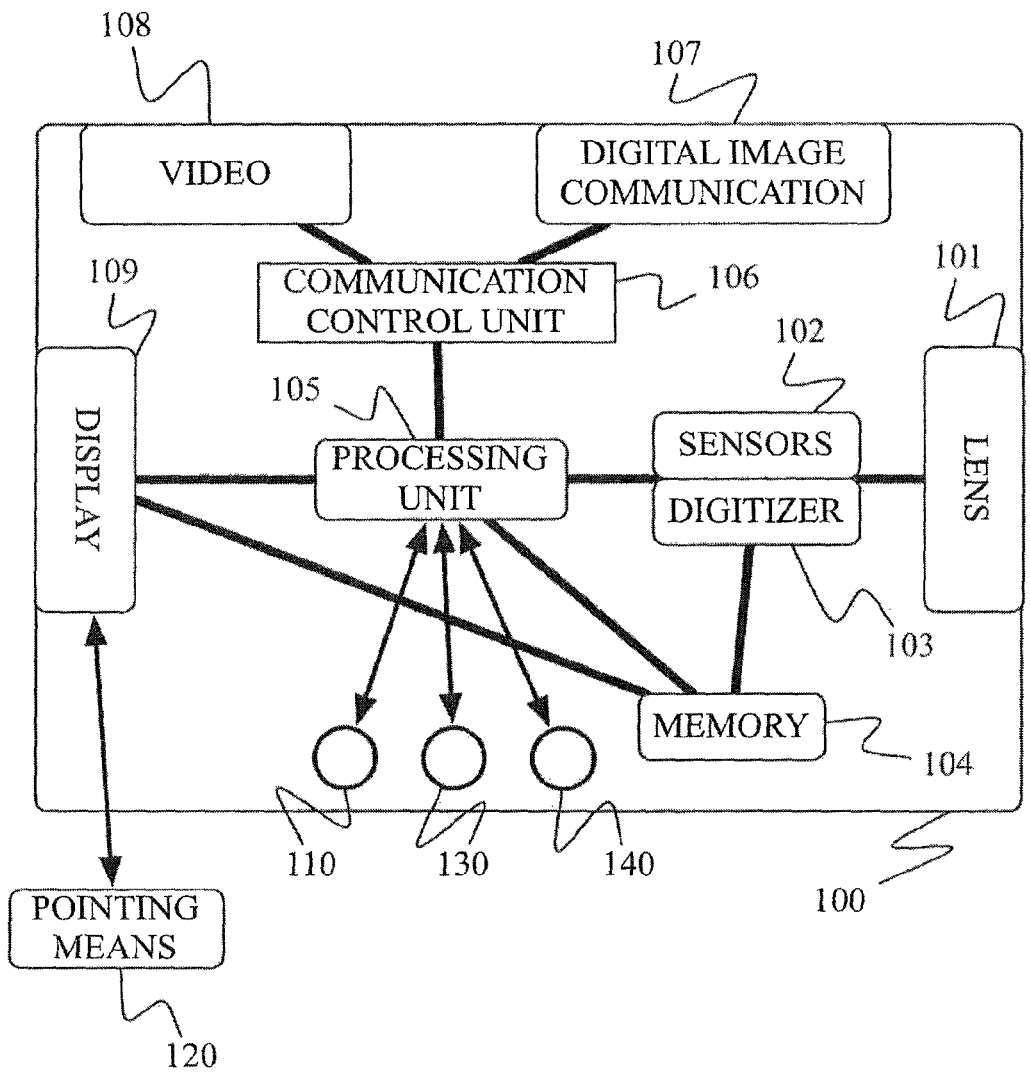
FIG. 1 is a functional block diagram for an apparatus according to the present invention.

FIG. 1 is a functional block diagram illustrating a colour image processing apparatus, 100, according to the present invention. The apparatus, 100, is basically an adapted digital video camera. The lens, 101, e.g. a normal camera lens being transparent at least for wavelengths visible to the human eye. The sensors, 102, may be arranged to form digital sensor arrays with sensitivity suitable at least for wavelengths visible to the human eye, i.e. the spectral range of the sensor(s), 102, used to capture an image is adapted to cover at least the wavelengths of human vision, which means normal film or ordinary digital camera sensors (wavelengths roughly between 400 and 800 nm). Each element in the sensor array (i.e. pixel) stores, temporarily, values for several primary colours, normally Red, Green and Blue. Digitizer, 103, is a conventional A/D-converter transforming an analog representation of a colour image captured by the sensors, 102, into a digital representation of said colour image, Ic. The apparatus, 100, has further a storage means, 104, i.e. any suitable RAM memory, a processing means, 105, e.g. a CPU, ASIC-circuit, ALU interconnected with other suitable hardware, as known to a person skilled in the art. A communication control unit, 106, which may comprise a converter for converting a colour image into a suitable format, interconnects the processing means, 105, with an analog image/video input/output connection unit, 108, and a digital image/video input/output connection, 107. The connection 107 may be an ad hoc connection adapted for the communication with an external devices such as a digital camera and/or a network connection, e.g. an Internet connection, realised e.g. as a conventional telephone modem connection or USB-port A display, 109, is connected with storage means 104 and/or processing means 105, allowing the display of a colour image stored in memory 104.

In one embodiment, the display, 109, the processing means, 105, and storage means 104 are arranged to allow an interactive selection of areas in the colour image displayed on display, 109, by the usage of interactive pointing means, 120, e.g. a computer mouse or similar. This is known and will not be described further here.

In one embodiment, the processing means, 105, are interconnected with interactive control means, 110, and/or, 130, and/or 140, such as selector buttons, knobs or similar, allowing an interactive control of the pre-washing steps, 215, 240, and the interactive control of parameter values for the histogram equalization step, 250, as described in detail below. In one embodiment, control means, 130, is a knob with 5 distinct positions for selecting what type of pre-wash to apply depending on application, as described below, but other possibilities exist. In one embodiment, control means 140, is a knob with 7 distinct positions to select what specific combination of updated colour pixel matrixes, Mi's, to use when updating a colour image, depending on application, but other possibilities exist. Generally, control means, 110, is a knob with N distinct positions for selecting a suitable threshold value K depending on application, as described below.

Figure 2:
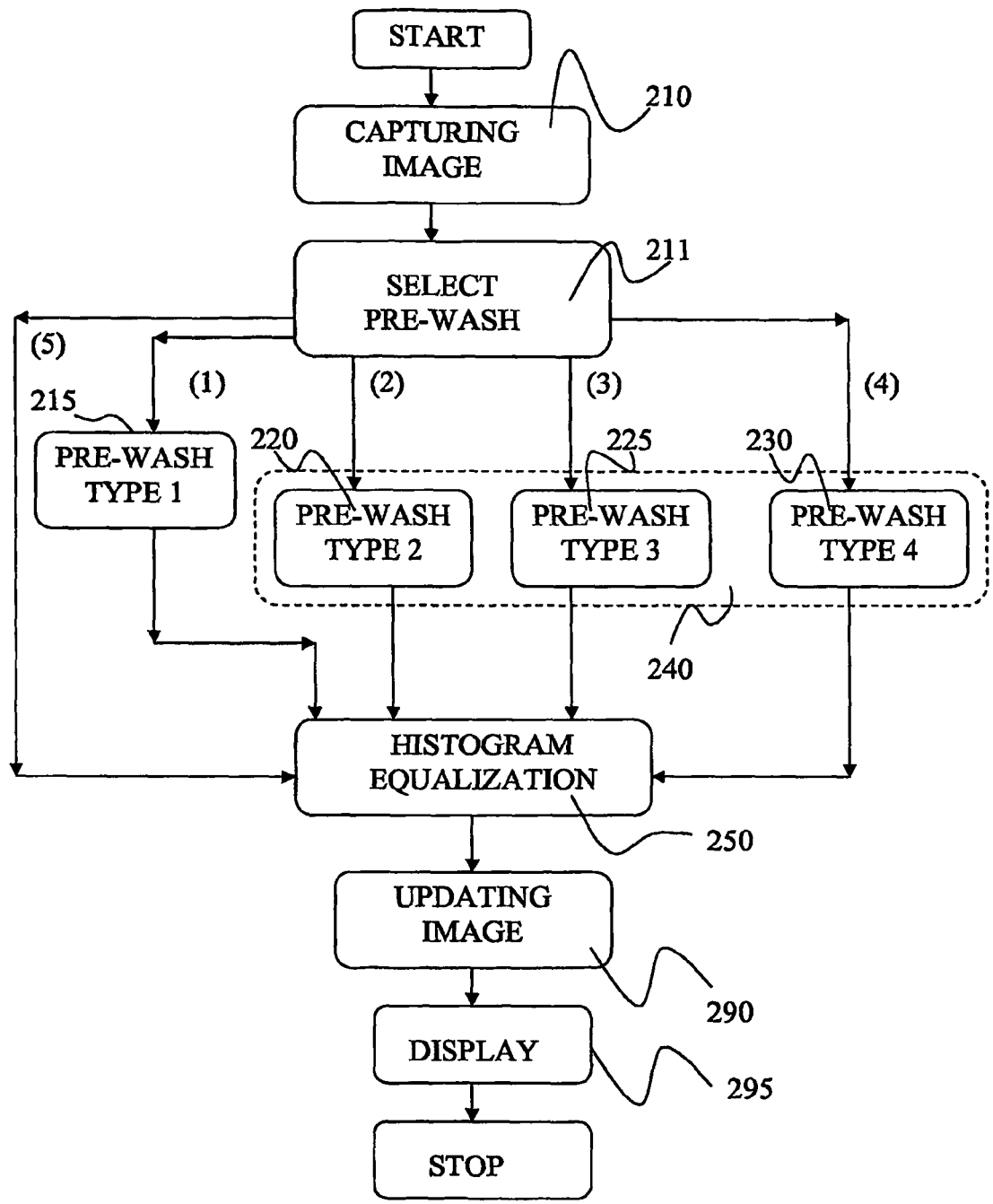
FIG. 2 is a flowchart diagram illustrating the method according to the invention.

FIG. 2 shows a flowchart illustrating the method according to the invention. The method is generally carried out by loading a software program, stored in storage means 104, into processing means 105.

With reference to FIG. 2, the method according to the invention starts with the capturing step, 210, to obtain a stored version of a colour image representation, Ic, in storage means 104. Live images may be captured through lens, 101, further by sensors 102, then converted into a digital format by A/D-converter, 103, and then stored in memory 104, in a known manner, or can be read directly from external devices via connections 107 or 108. Analog video images are read in via input connection, 108, decoded and encoded into a suitable digital format, Ic, by processing means, 105, and/or communication control unit 106, and then stored in memory 104, in a known manner. Digital video images are read in via input connection, 107, possibly transferred to a more suitable data format, Ic, by processing means, 105, and/or communication control unit 106, and then stored in memory, 104, in a known manner. Thus, after step 210, there is a stored digital representation of a colour image, Ic, in memory, 104, in a suitable format. In one embodiment, a suitable format means that Ic is made up of a set of separate colour channels or colour pixel matrixes, Mi, normally one matrix for red, one matrix for green and one matrix for blue. According to the invention, said set of matrixes comprises at least two distinct colour matrixes. The invention is however applicable for all types of colour images, e.g. Cyan-Magenta-Yellow-Black encoded images, since any colour image can be transformed into said suitable data format, Ic, in a known manner.

The method then proceeds to selecting step, 211, in which the processing means, 105, reads the positions of each and all of the interactive control means, 110, 130, and 140. If the control means 130 is positioned in its first position, (1), then the method proceeds to pre-wash step 215, described in detail below. If the control means 130 is in its second, (2), third, (3), or fourth, (4), position, then the method proceeds to pre-wash step 240, described in detail below. If the control means, 130, is in its fifth, (5), position, then the method proceeds to the histogram equalization step, 250, in which an updated version, M1', for at least one of said colour pixel matrixes, M1, is created. Step 250 is described in more detail below with reference to FIG. 3. From pre-wash steps 215 and 240, the method proceeds to histogram equalisation step 250. After step 250, the method according to the invention proceeds to step 290, in which an updated version Ic', of the image, Ic, is created, by combining said updated pixel matrix version, M1', with at least one other pixel matrix, Mi, or updated pixel matrix, Mi'. In step 290, the updated image representation, Ic', is stored in memory 104. In step 295, the updated image representation, Ic', in memory 104 is displayed on display 109, in a known manner.

Thus, according to the invention, the histogram equalization step is carried out for at least one of the pixel matrixes, however, the best result is normally obtained when all three pixel matrixes are histogram equalized, so that the updated version of said image, Ic', is made up of updated versions of all three colour pixel matrixes, i.e. green, red and blue. However, it may be advantageous not to histogram equalize all the pixel matrixes. What is important according to the invention is that the histogram equalisation step 250 is carried out separately, for the different colour pixel matrixes, Mi.

Figure 3:
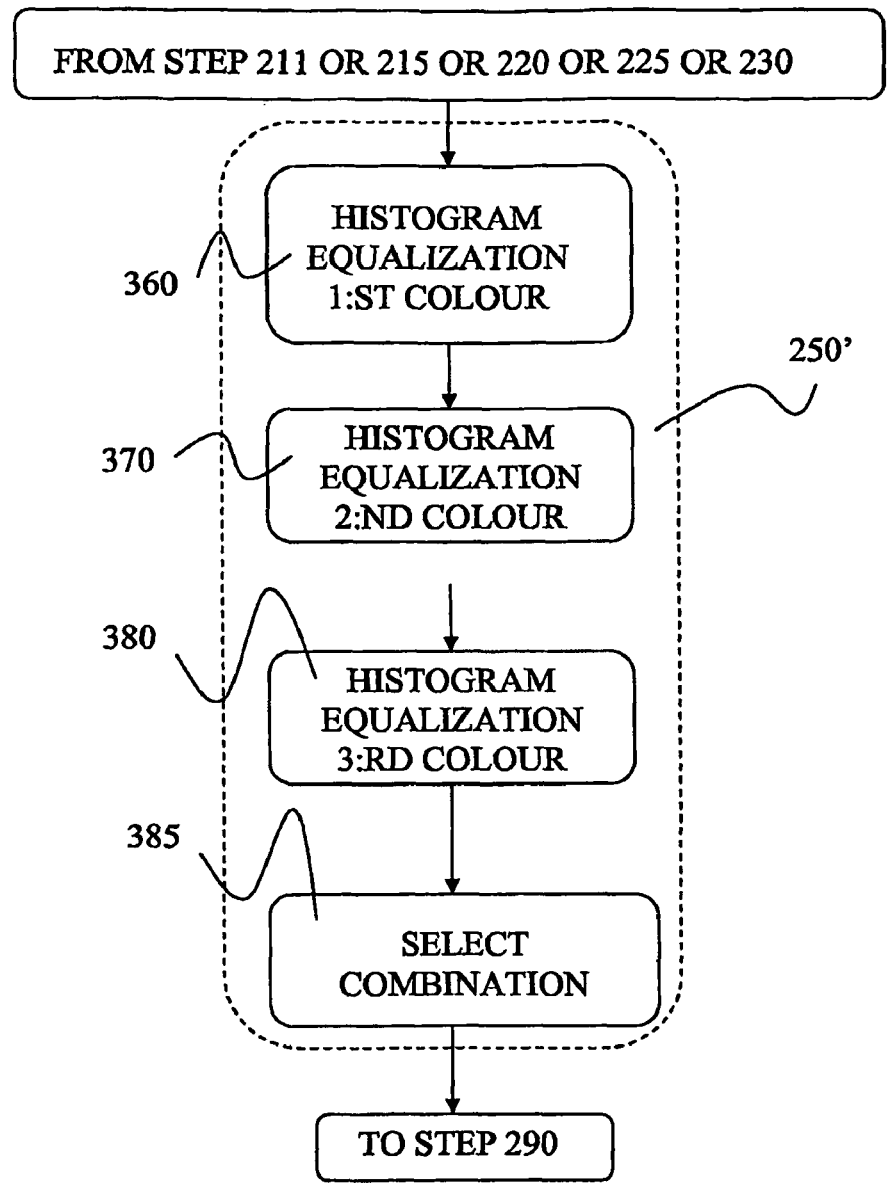
FIG. 3 is a flowchart diagram illustrating step 250 in FIG. 2.

Thus, in one embodiment illustrated in FIG. 3, the histogram equalization step, 250, comprises a first histogram equalisation step, 360, for said first colour pixel matrix, M1, e.g. green, a second histogram equalisation step, 370, for a second colour pixel matrix, M2, e.g. red, and a third histogram equalisation step, 380, for the remaining colour pixel matrix, M3, e.g. blue, in this case. The method according to the invention proceeds to step 385 after step 380. A selection is made in step 385 what updated pixel matrixes, Mi':s, will be used in said updating step 290. Thus, the updated image, Ic', will be made up of at least these selected matrixes, Mi:s, after step 290. In one embodiment, the selection in step 385 is carried out interactively by positioning the selecting means, 140. Thus, in one embodiment, if selecting means, 140, is in its first, second or third position, only one updated colour matrix, M1, is selected, i.e. green or red or blue, if selecting means 140 is in its fourth, fifth, or sixth position, then a combination of two updated colour pixel matrixes, Mi':s, are selected, i.e. red and green, red and blue or green and blue, and if selecting means 140 is in its seventh position, then all three updated colour pixel matrixes Mi':s are selected, however, other possibilities obvious for a person skilled in the art exist.

The histogram equalisation steps, 360, 370, and 380, are completely analogous, and only step 360 will be described in detail here, with reference to FIGS. 4, 5, 6, 7 and 8.

Figure 4:
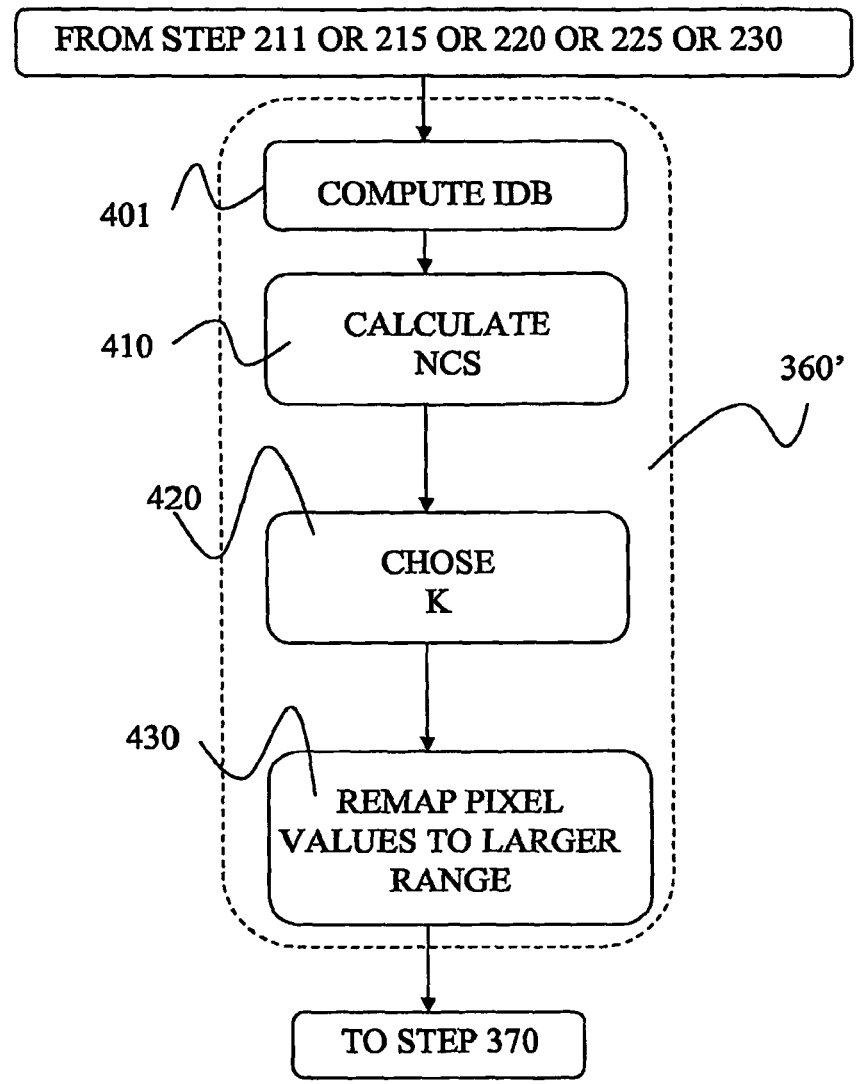
FIG. 4 is a flowchart diagram illustrating step 360 in FIG. 3.
Figure 5:
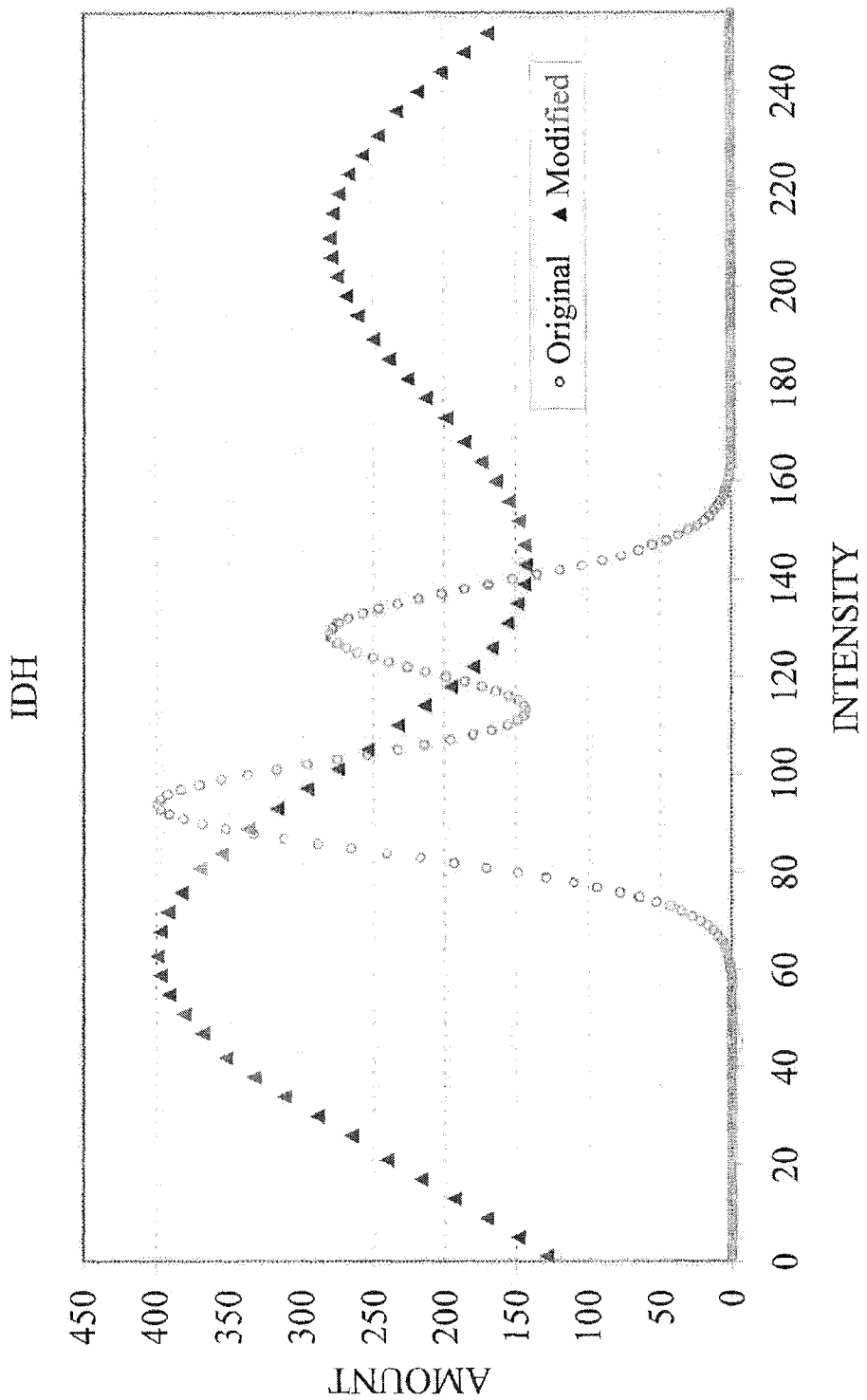
FIG. 5 illustrates the intensity distribution diagram before, IDH, and after, IDH', histogram equalization for a single colour channel.

In one embodiment, the histogram equalisation step is carried out as illustrated in FIG. 4. As illustrated in FIG. 4, the histogram equalization starts in step 401, in which an intensity distribution histogram, IDH, for the colour pixel matrix in question, Mi, is computed. This is done by counting the number of pixels in said matrix, Mi, having a specific colour intensity, for all quantized colour intensity values, e.g. 256 values in case of an 8-bit quantization, i.e. $2^8=256$, and forming a histogram distribution diagram based on said counting as illustrated in FIG. 5. FIG. 5 illustrates the IDH for a colour matrix, Mi, before, as grey circles, and after, as black triangles, the histogram equalisation step 250. As illustrated in FIG. 5, before histogram equalisation, the colour pixel matrix, Mi, comprises intensity values only in the range between the quantization values of about 60 and 160. The histogram equalization step, 250, "stretches out" the intensity distribution, e.g. so as to form a result illustrated by the grey bars in FIG. 5.

Figure 6:
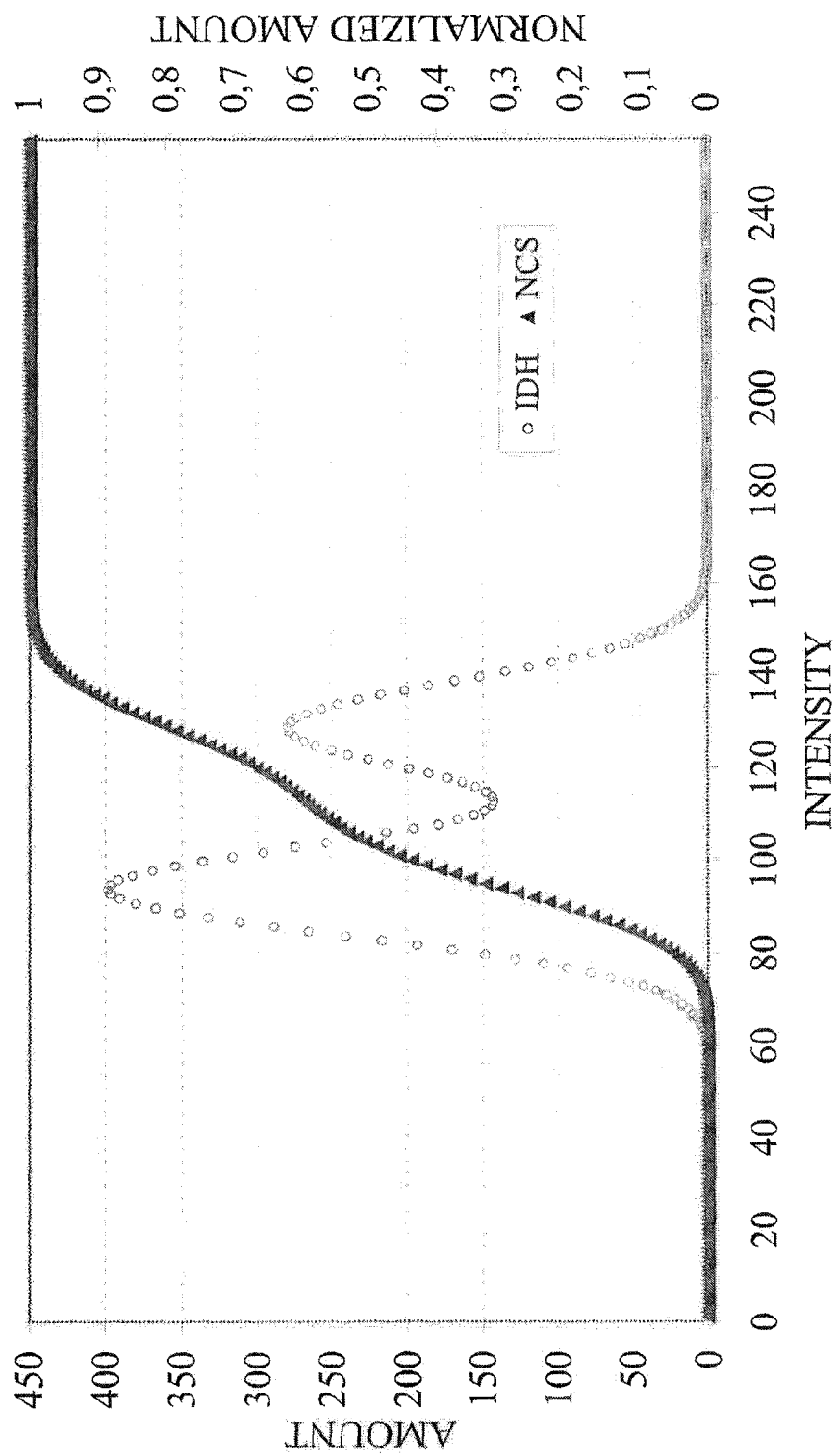
FIG. 6 illustrates the formation of the normalized cumulative sum, NCS, for a single colour channel.

The method proceeds to step 410 from step 401, in which the normalized cumulative sum, NCS, of IDH is calculated, as illustrated in FIG. 6. In FIG. 6, the grey circles represent the IDH before histogram equalization and the black triangles illustrate the NCS for said IDH. The method then proceeds to step 420, wherein a suitable threshold value, K, is chosen. This can be accomplished in an interactive way by positioning control means 110. According to the invention, the choice of K depends on application and/or environmental conditions, e.g. for a landing ground in fog a suitable value for K can be $K_1$, for a deep under water application $K_2$, for under water applications in tropical waters, $K_3$, and so on.

Generally, K is a stretching factor determining how much the IDH shall be "stretched out", i.e. the degree of intensity distribution expansion. Normally, the IDH is stretched out to its full range, as illustrated in FIG. 5 but the invention is not restricted hereto.

Figure 7:
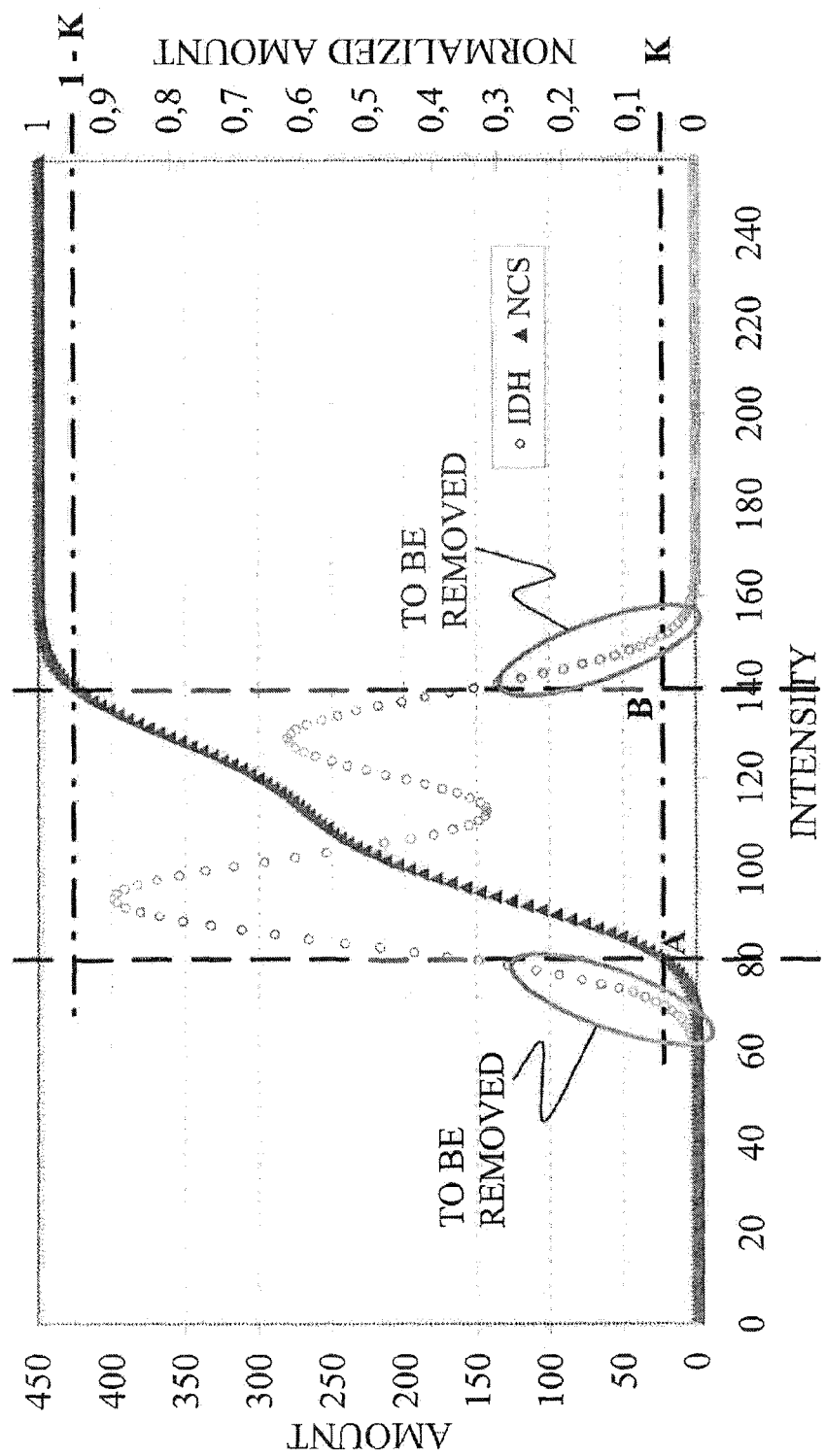
FIG. 7 illustrates the selection of a suitable range RAB by selecting a threshold value K, FIG. 8. illustrates the linearization effect for NCS.
Figure 8:
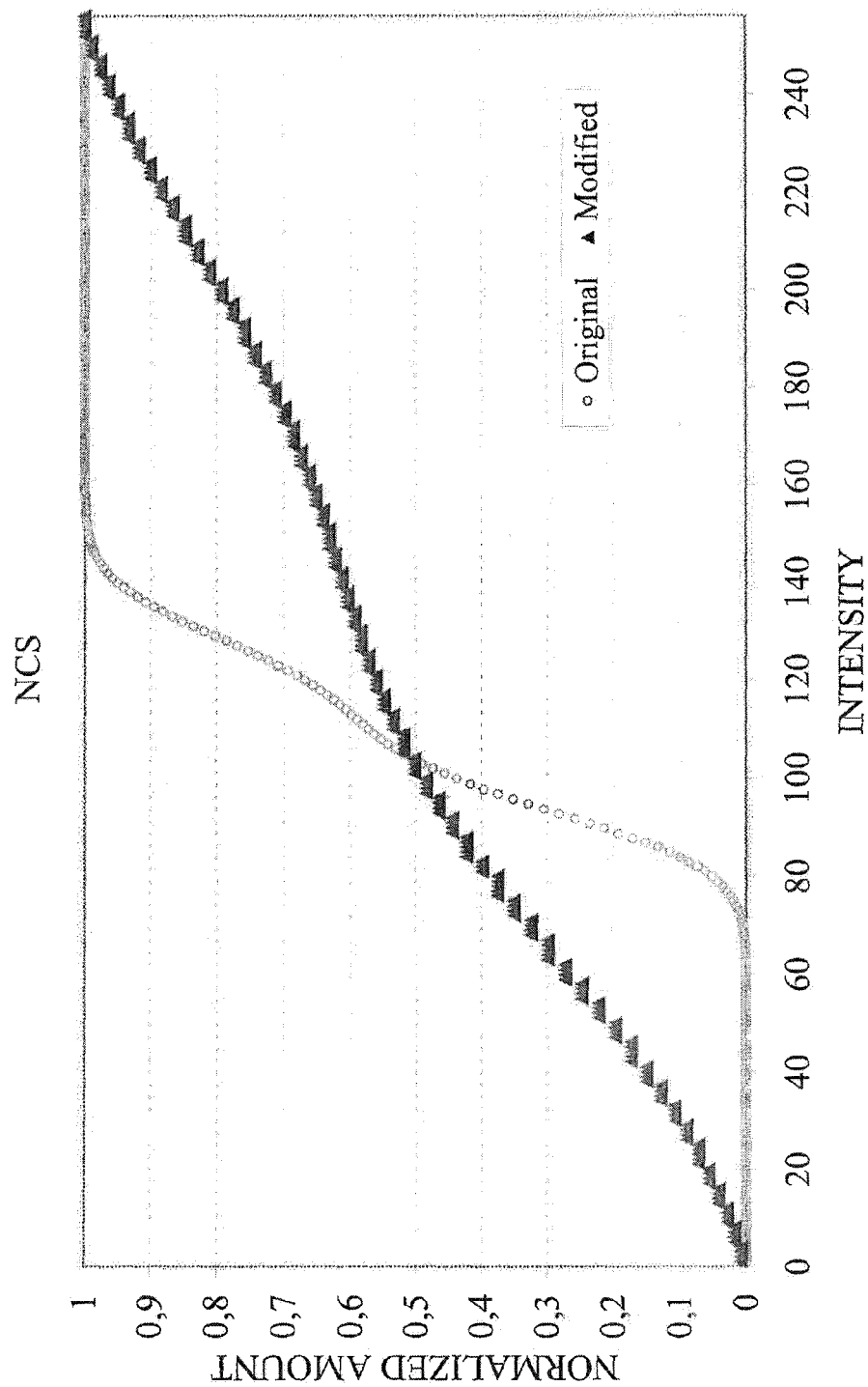

In one embodiment, K, represents a percentage threshold value, as illustrated in FIG. 7. After step 420, the method proceeds to step 430, in which the intensity distribution histogram, IDH, is stretched out to form an updated version, IDH', by remapping the original pixel values on to a larger range of intensity values, as illustrated in FIG. 5. This can be accomplished by first selecting a first range $R_{AB}$ for IDH, e.g. by identifying intensity values in the NCS having values A, and B, corresponding to said percentage threshold value K, and 1-K, as illustrated in FIG. 7. In FIG. 7, K is set to 5% and the value of A is about 80 and the value of B is about 140 on the intensity scale. All intensity values outside the range $R_{AB}$, i.e. intensity values below A or exceeding B, are thereafter removed from IDH, and the pixel values of IDH are remapped on to a second larger range $R_{AB}'$, of pixel intensity values. $R_{AB}'$ is normally the whole quantization range, as illustrated in FIG. 5, but other possibilities exist. The remapping step can be carried out pixel by pixel by forming suitable look-up tables, as known to a person skilled in the art. The histogram equalization step, 250, thus gives a more linear cumulative histogram, NCS, as illustrated in FIG. 8.

Histogram equalization is per se an established algorithm described in several image processing texts, e.g. Gonzalez, R. C. and Wintz, P., Digital Image Processing, Addison-Wesley, Reading, Mass., 1987. What is important according to the invention is that the histogram equalization step is carried out separately for each individual colour pixel matrix, $M_N$. The commercial software program Photoshop™ has preinstalled functions to perform histogram equalization for individual colour channels, and these functions may be used as parts for carrying out the present invention.

In one embodiment, the three separate histogram equalization steps, 360, 370 and 380 all use the same threshold value K, and the updated version, Ic, of the colour image is made up of all updated matrixes, Mi', but the invention is not restricted hereto.

In one embodiment, the imaging system according to the invention can allow for different choices of K for different sections/parts of an image and cumulative histogram calculation can be based on the local neighbourhood of every pixel in the image. This means that different K-values are used for different segments in the image, e.g. by using segmentation algorithms overriding the manual control of K For instance, for applications with many blinding particles, such as deep under sea work close to the bottom using high power lamps, this embodiment can be advantageous.

In case of films, i.e. a sequence of images, different values for K can be applied for different images in the sequence, according to the invention.

Figure 10:
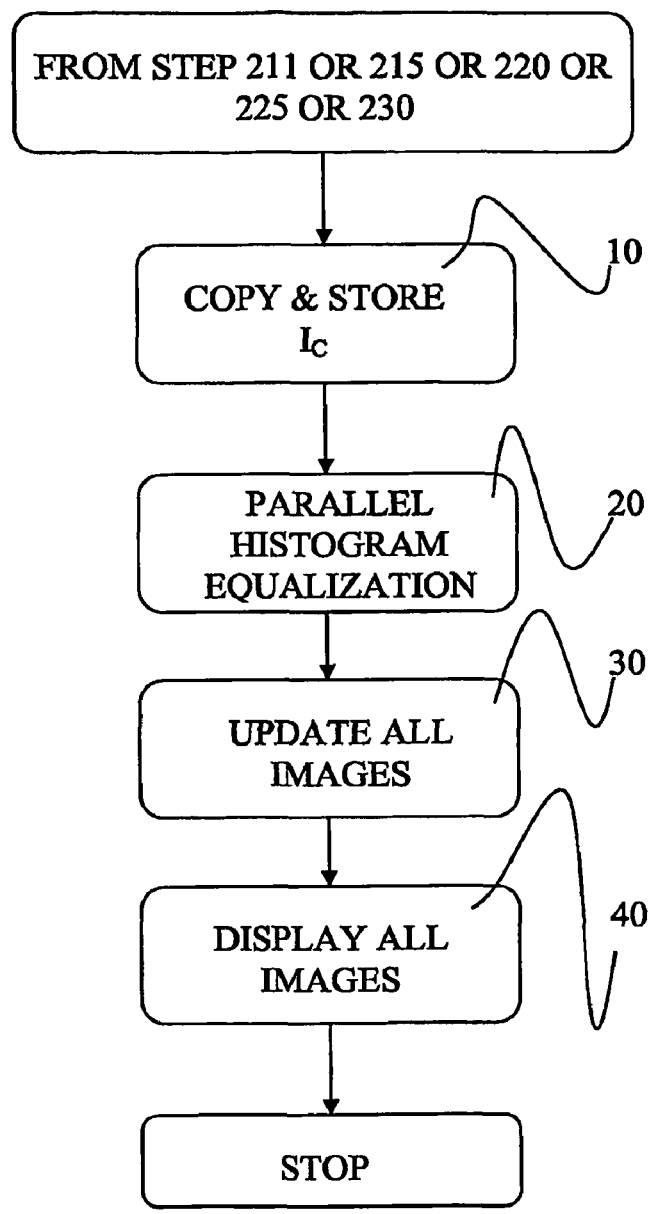
FIG. 10 is a flowchart diagram illustrating one embodiment of the method according to the invention.

Another possibility particularly advantageous for real time applications is to apply the method according to the invention in parallel on at least two identical image sequences, i.e. one being a copy of the other, and to display the image sequences next to each other. A specific parameter setting, i.e. a settled combination of type of pre-wash, matrix combination and K-value, can thus generate a "best" image sequence which currently can be compared with a "scan" image sequence scanning for better alternative settings during parallel display next to each other in real time. If the "scan" image sequence provide a higher perceived image quality, i.e. specific object representations stand out better, then the end user may choose this sequence to become the "best" image sequence using this settled combination of type of pre-wash, matrix combination and K-value, while the formerly "best" sequence starts to scan for even better parameter settings. In this way, a continuous adaptation and proper parameter control according to the changing environment can be obtained in an effective way. FIG. 10 is a flow chart illustrating how this embodiment can be realised.

After the step 211 or 215 or 220 or 225 or 230 described with reference to FIG. 2, at least one copy of said colour image representation, Ic, is made and stored in said storage means 104, in step 10 in FIG. 10. Thus, at least two stored versions Ic, Ic2, of said image Ic are present in storage means 104, after step 10. In step 20, a histogram equalisation step is carried out in parallel for said at least two identical colour images, Ic, Ic2, normally with different parameter settings regarding type of pre-wash and/or stretching factor, K, and/or matrix combination for Ic, with respect of the parameter settings for Ic2. The step 20 is nothing but step 250, described with reference to FIGS. 2, 3 and 4, applied for Ic and IC2 separately. In step 30 updated image versions Ic', Ic2' are formed. Step 30 is nothing but step 290, described with reference to FIG. 2, applied for Ic' and Ic2' separately. Ic' and Ic2', are thereafter displayed on display means 109 in step 40.

Now, referring back to FIG. 2, the pre-washing steps 215, 220, 225, 230 and 240 shall be described in more detail.

Figure 9:
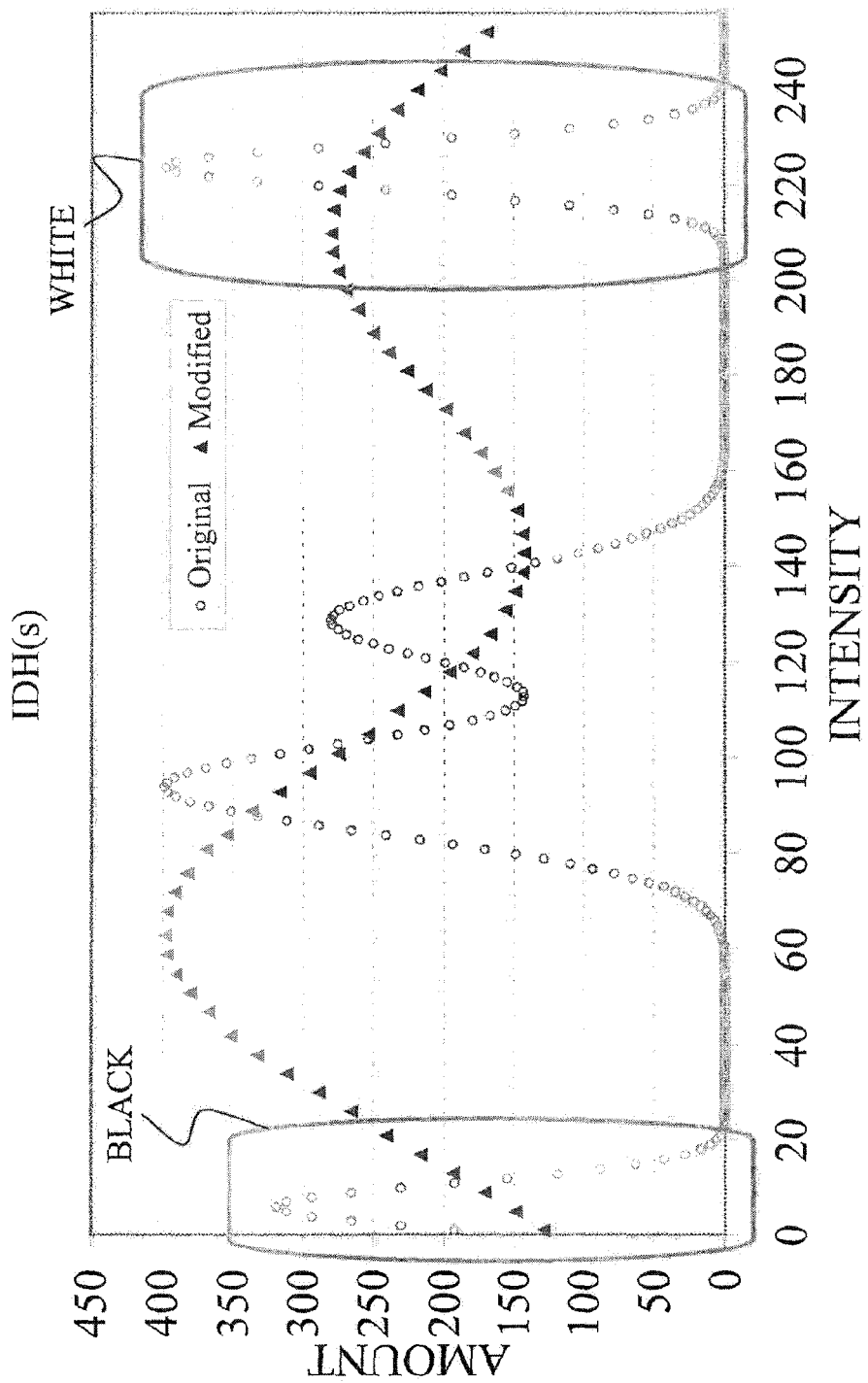
FIG. 9 illustrates the pre-wash step, according to one embodiment of the invention.

In step 215, the colour content of artificially introduced artefacts in the image are identified, and removed as illustrated in FIG. 9. Such artefacts often occur when analog video signals are captured by digital devices. These images often contain black/white frames and/or texts and/or lettering to indicate position, date, time, status etc. Thus, in FIG. 9, the high intensity pixel values, corresponding to "WHITE" values in FIG. 9, and the low intensity pixel values, corresponding to "BLACK" values in FIG. 9, are discarded before the histogram equalization step. This can be accomplished by using known algorithms for image processing.

Step 240 can be realized by any of steps 220, or 225 and 230, or a combination thereof, not illustrated in FIG. 2. In step 240, undesired segments of the image, Ic, are identified and removed.

In step 220, a text recognition algorithm identifies what segments in the image, Ic, to remove before the histogram equalisation step. All pixel values in said segments will thus be discarded.

In step 225, the image, Ic, is segmented by human interaction, e.g. by moving pointing means, 120, over a display 109, displaying said image.

In step 230, an image segmentation algorithm adapted for a specific application identifies what segments/pixels in the image, Ic, to discard, e.g. at deep under sea work close to the bottom using high power lamps, with many blinding particles "floating" in the image, all pixels having an intensity exceeding a threshold value may be discarded. Another possibility is to use segmentation algorithms that identify specific "firm" object/s with a known form in the image, such as part/s of an oil rig. Such algorithms are known and will not be described in detail here.

The method according to the invention seems to give the best result in situations where the spectral dynamic range of the colour image is limited/restricted to a relatively narrow segment of intensity values for each channel/colour. However, the invention is not restricted to only such situations.

The apparatus according to the present invention can be realised e.g. by a computer readable medium, e.g. hard disc memory, CD-ROM, magnetic tape, flash-memory etc, with stored computer program code means to be stored in said memory, 104, to make said processing means 105 execute at least one procedure realizing the method according to the invention. As an alternative, pure hardware logic can be used, such as e.g. ASIC-circuits, as known to a person skilled in the art.

In one embodiment, the invention is realised in form of an adapted camera or video camera, thus providing a handy, relatively small and low weight apparatus being mobile and versatile in use as an economical choice.

In another embodiment, the apparatus according to the invention is realised in form of a detector device which may be adapted in a specific way depending on application, e.g. specific lamps may be arranged in a specific way to provide optimal lighting conditions, e.g. in the case of food safety, meat slices may be illuminated from below and so on. In case of aviation security, the detector may comprise a lens that is aerodynamically integrated with the airplane body at an optimal position, e.g. under the nose. Also, in case of vehicle application, the detector display means may be adapted so as to project the image on the wind screen and so on.

In still another embodiment, the invention is realised in form of a security surveillance and/or monitor system comprising at least one apparatus according to the invention.

In still a further embodiment, the invention is realised in form of a Remotely Operated Vehicle comprising colour image capturing means communicating with an apparatus according to the invention, e.g. by means of an electrical or optical cable, radio link etc. This is an economical solution since in this way only the image capturing means need to be designed for the tough (ROV) conditions e.g. under water.

In still another embodiment, the invention is realised in form of an apparatus for inspecting the inner parts of the human eye comprising means for capturing a colour image from the inside of the eye wherein said capturing means are connected with an apparatus for executing the method according to the invention. The apparatus may be adapted in many ways, e.g. for obtaining optimal lighting conditions, e.g. by specific lamps directed towards the eye, or to provide optimal zoom and/or resolution and/or having specific preinstalled parameter settings regarding intensity diagram stretching, e.g. choice of K, combination of updated colour matrixes to form the updated image and type of pre-wash, for the effective and efficient detection of specific malformations and/or illnesses, and/or other arrangements to improve patient conditions, e.g. providing a comfortable and firm support of the head, in order to minimise the risk of erroneous diagnoses and/or the time required for the inspection.

In still a further embodiment, the invention is realised in form of a face mask comprising colour image display means arranged for eye view wherein said display means are connected with an apparatus for executing the method according to the invention. The face mask may be in form of e.g. adapted goggles, providing particularly efficient means for amplified vision e.g. during rescue operations in foggy/smoky environments e.g. during fire fighting or in case of a fire in cockpit and so on.

The present invention has been described by way of examples only and is not restricted hereto, e.g. the apparatuses according to the invention may be implemented in a single device or several physically separate devices in many different ways, the invention may be applied in technical fields not explicitly mentioned in this application, e.g. military applications etc. Many modifications can be made by a person skilled in the art. Therefore, the scope of the invention is defined by the following claims only.

The invention claimed is:

1. An image processing method for processing a colour image, $I_C$, formed by at least two distinct colour pixel matrixes, $M_N$, by a processing means in an imaging system wherein said method comprises the following steps:
   reading the position of at least one of a plurality of interactive control means by the processing means, said control means being configured to allow an interactive control of a plurality of parameter values for a histogram equalization step;
   processing said image, $I_C$ by a histogram equalization step by the processing means using said parameter values comprising the following steps:
      selecting at least a first colour pixel matrix, $M_1$, from said at least two distinct colour pixel matrixes $M_N$,
      separately carrying out a histogram equalization step for at least said first colour pixel matrix, $M_1$, forming an updated version, $M_1'$, of said first colour pixel matrix, said histogram equalization step comprising the following steps:
         computing an intensity distribution histogram, IDH, for said first colour pixel matrix, $M_1$,
         calculating the normalized cumulative sum, NCS, for said IDH,
         choosing a threshold value, K, for said normalized cumulative sum, NCS,
         identifying pixel intensity values A and B defining a first range, $R_{AB}$, of pixel intensity values based on said threshold value K, in IDH,
         forming an updated version, IDH', of said intensity distribution histogram by discarding all pixel intensity values outside said range $R_{AB}$, and
         mapping the pixel values within said first ran $R_{AB}$ on to a second larger range, $R_{AB}'$, of pixel intensity values;
   forming an updated version, $I_C'$, of said image, $I_C$, so that $I_C'$ comprises at least said updated colour pixel matrix, $M_1'$, and
   displaying said updated version, $I_C'$, on a display.

2. The method according to claim 1 wherein said histogram equalization step is carried out separately for each and all of said colour pixel matrixes, $M_N$, forming updated versions, $M_N'$, of said colour pixel matrixes, and forming an updated version, $I_C'$, of said image, $I_C$, so that $I_C'$ comprises all of said updated colour pixel matrixes, $M_N'$.

3. The method according to claim 1 wherein a pre-washing step is carried out by the processing means before said histogram equalization step, said pre-washing step comprising the following steps:
   creating an intensity histogram, $I_{HI}$, for at least one specific colour pixel matrix,
   selecting at least one range of pixel intensity values for said intensity histogram, $I_{HI}$,
   creating an updated version $I_{HI}'$ of said intensity histogram by discarding the intensity histogram values within said range,
   feeding the following histogram equalization step with $I_{HI}'$ as input for further processing.

4. The method according to claim 1 wherein a pre-washing step is carried out by the processing means before said histogram equalization step, said pre-washing step comprising the following steps:
   identifying at least one undesired pixel area in said image representation, $I_C$, and,
   discarding all pixel values within said area forming an updated version, $I_C'$, of said image representation,
   feeding the following histogram equalization step with $I'_{HI}$ as input for further processing.

5. The method according to claim 4 wherein said identification step is carried out by an image segmentation algorithm.

6. The method according to claim 4 wherein said identification step is carried out by a text recognition algorithm.

7. The method according to claim 4 wherein said identification step comprises human interaction by moving pointing means over a display displaying said image, $I_C$.

8. The method according to claim 1, further comprising the step of capturing said colour image representation, $I_C$, by using sensors having a spectral range at least between about 400 and 800 nm.

9. The method according to claim 1, wherein the method is applied on a sequence of consecutive colour images, on an image by image basis.

10. A non-transitory computer readable medium having stored computer program code means, wherein said stored program code means comprises program code means to make a computer execute at least one procedure realizing the method according to claim 1, when said program is loaded in said computer.

11. An image processing apparatus having processing means with access to a digital representation of a colour image, $I_C$, captured in storage means by capturing means or through data communication means or through video connection means, wherein said storage means has stored program code means configured to make said processing means to execute at least one procedure realizing the method according to claim 1, when said program code means are loaded in said processing means.

12. An image processing apparatus according to claim 11 comprising interactive control means interconnected with said processing means wherein said control means allows for an interactive control of a threshold value, K, and thereby the degree of intensity distribution expansion in said histogram equalization step.

13. An image processing apparatus according to claim 11 further comprising display means and/or integrated image capturing means.

14. An image processing apparatus according to claim 11 wherein said apparatus comprises interactive pre-wash selecting means and/or interactive pointing means arranged to interact with display means.

15. An image processing apparatus according to claim 11 wherein said apparatus comprises selecting means allowing an interactive selection of what specific combination of updated colour pixel matrixes $M_N'$ to form said updated image $I_C'$.

16. A camera comprising an apparatus according to claim 11.

17. A video camera comprising an apparatus according to claim 11.

18. A detector device for detecting physical object representations in colour images, said detector comprising means for providing specific lighting conditions including an apparatus according to claim 11.

19. A security surveillance and/or monitor system comprising an apparatus according to claim 11.

20. A vehicle comprising an apparatus according to claim 11.

21. The vehicle according to claim 20 wherein said apparatus comprises display means adapted for projecting said image, $I_C$, on at least one windscreen of the vehicle.

22. A Remotely Operated Vehicle comprising a colour image capturing means communicating with an apparatus according to claim 11.

23. An apparatus for inspecting the inner parts of the human eye comprising means for capturing a colour image from the inside of the eye, wherein said capturing means are connected with an apparatus according to claim 11.

24. A face mask comprising colour image display means arranged for eye view, wherein said display means are connected with an apparatus according to claim 11.

* * * * *